United States Patent
Yamaguchi et al.

(10) Patent No.: US 6,623,564 B2
(45) Date of Patent: Sep. 23, 2003

(54) METHOD OF RECOVERING SYNTHETIC SUBSTRATES

(75) Inventors: Masatoshi Yamaguchi, Ninomiya-machi (JP); Takahito Kikukawa, Kaisei-machi (JP); Kyoichi Kishi, Kaisei-machi (JP); Yoshihiro Tuyuki, Minamiashigara (JP); Akira Nakazawa, Odawara (JP); Kouichi Oota, Odawara (JP); Keisuke Shiba, Minamiashigara (JP); Nobuyuki Ito, Minamiashigara (JP)

(73) Assignee: Panac Industries, Inc., Kanagawa-ken (JP)

( * ) Notice: Subject to any disclaimer, the term of this patent is extended or adjusted under 35 U.S.C. 154(b) by 0 days.

(21) Appl. No.: 09/789,947

(22) Filed: Feb. 21, 2001

(65) Prior Publication Data

US 2001/0020483 A1 Sep. 13, 2001

(30) Foreign Application Priority Data

| Feb. 22, 2000 | (JP) | 2000-050445 |
| Feb. 22, 2000 | (JP) | 2000-050538 |
| Jan. 25, 2001 | (JP) | 2001-017053 |

(51) Int. Cl.[7] ............... B08B 7/02; B08B 7/00; B08B 3/00; B08B 3/14
(52) U.S. Cl. ............... 134/16; 134/19; 134/27; 134/34; 134/38; 134/42
(58) Field of Search ............... 134/16, 19, 26, 134/27, 34, 38, 42

(56) References Cited

U.S. PATENT DOCUMENTS

| 4,602,046 A | 7/1986 | Buser et al. |
| 4,612,057 A | 9/1986 | Buser et al. |
| 5,270,074 A * | 12/1993 | Kobayashi et al. ....... 134/38 X |
| 5,309,177 A | 5/1994 | Shoji et al. |
| 5,384,159 A * | 1/1995 | Gillette et al. .............. 427/140 |
| 5,414,021 A | 5/1995 | Eddy |
| 5,475,036 A | 12/1995 | Hosoyama et al. |
| 5,542,982 A * | 8/1996 | Terada et al. .................. 134/5 |
| 5,817,183 A * | 10/1998 | Eddy-Helenek et al. ...... 134/19 |
| 6,066,229 A | 5/2000 | Komine et al. |
| 6,436,197 B1 * | 8/2002 | Sapienza et al. .............. 134/16 |

FOREIGN PATENT DOCUMENTS

| EP | 0 064 229 A2 | 4/1982 |
| EP | 0 064 229 B1 | 4/1982 |
| EP | 0 553 787 A1 | 1/1993 |
| EP | 0637 617 A2 | 7/1994 |

(List continued on next page.)

OTHER PUBLICATIONS

Japanese Office Action, No Date.
Statement of Relevance of Japanese Office Action, No Date.
Partial Translation of Kokai JP–A 9–141657 dated Jun. 3, 1997.
Abstract of Kokai 09–141657 dated Jun. 3, 1997.

*Primary Examiner*—Donald R. Valentine
(74) *Attorney, Agent, or Firm*—Stroock & Stroock & Lavan LLP

(57) ABSTRACT

The present invention relates to a method of removing a layer of material from a synthetic resin or an organic acid ester of cellulose comprising: washing the layer from the substrate with an aqueous alkali solution with a temperature of at least 105° C., and then washing the alkali solution from the substrate. Furthermore, the present invention relates to a pressure vessel used for the above method, comprising a longitudinal cylindrical body having a circular cross-section, an end plate connected to the top of the cylindrical body and an inverted end plate connected to the lower part of the cylindrical body in a manner such that its convex part faces upwards wherein the pressure vessel has a strainer plate and a stirring blade inside the cylindrical body.

11 Claims, 4 Drawing Sheets

FOREIGN PATENT DOCUMENTS

| | | |
|---|---|---|
| GB | 2316020 | 2/1998 |
| JP | 47-021477 | 10/1972 |
| JP | 49-132165 | 12/1974 |
| JP | 50-80371 | 6/1975 |
| JP | 50-104276 | 8/1975 |
| JP | 51-52491 | 5/1976 |
| JP | 52-37986 | 3/1977 |
| JP | 52-125582 | 10/1977 |
| JP | 53-94381 | 8/1978 |
| JP | 54-66985 | 5/1979 |
| JP | 54-114581 | 9/1979 |
| JP | 55-166221 | 12/1980 |
| JP | 58-166016 | 10/1982 |
| JP | 62-35809 | 2/1987 |
| JP | 62-160451 | 7/1987 |
| JP | 02-273207 | 11/1990 |
| JP | 05-8228 | 1/1991 |
| JP | 04-360035 | 12/1992 |
| JP | 05-105786 | 4/1993 |
| JP | 05-269743 | 10/1993 |
| JP | 05-345321 | 12/1993 |
| JP | 06-41345 | 2/1994 |
| JP | 06-220243 | 8/1994 |
| JP | 6-306200 | 11/1994 |
| JP | 07-165978 | 6/1995 |
| JP | 07-179652 | 7/1995 |
| JP | 07-205154 | 8/1995 |
| JP | 07-256639 | 10/1995 |
| JP | 07-286064 | 10/1995 |
| JP | 09-1553 | 1/1997 |
| JP | 09-48025 | 2/1997 |
| JP | 09-141657 | 6/1997 | ........... B29B/17/00 |
| JP | 10-120820 | 5/1998 |
| JP | 10-245103 | 9/1998 |
| JP | 10-249315 | 9/1998 |
| JP | 11-34057 | 2/1999 |
| JP | 11-228577 | 8/1999 |
| SU | 1176295 | 8/1985 |
| SU | 1626243 | 2/1991 |
| SU | 1626244 | 2/1991 |
| SU | 1642439 | 4/1991 |
| WO | WO 93/19398 | 9/1993 |

\* cited by examiner

METHOD OF RECOVERING SYNTHETIC SUBSTRATES

BACKGROUND OF THE INVENTION

1. Field of the Invention

The present invention relates to an improved method of recovering a synthetic substrate from a layer of material such as a recording layer applied on the substrate and a device that can be used in the above-mentioned method.

2. Description of the Related Art

Materials comprising layers having various functions applied on a substrate comprising a synthetic resin or an organic acid ester of cellulose are used in many fields. For example, various types of recording material comprising a recording layer, etc. applied on a substrate such as cellulose triacetate, poly(ethylene terephthalate) or polycarbonate are widely used in practice. These recording materials include photosensitive photographic materials comprising a silver halide photosensitive layer, CD-ROM, CD-R, DVD and DVD-R materials comprising a colorant recording layer or a reflective layer applied on a PMMA or polycarbonate substrate.

With regard to an example of a method of recovering the polycarbonate substrate from optical discs, there is a method disclosed in Japanese Patent Application Laid-open No. 4-360035 (Japanese Patent Publication No. 2615277) in which discs having an aluminum reflective layer are treated in a concentrated aqueous alkali solution at 75 to 100° C. There is also a method disclosed in Japanese Patent Application Laid-open No. 5-345321 in which a plastic molding having a metal vapor deposition film is heated in hot water at 70° C. or higher so as to peel off the vapor deposition film.

With regard to a washing device used for recovering the synthetic substrate from the above-mentioned recording materials, a device disclosed in Japanese Patent Application Laid-open No. 5-8228 is known. This device can efficiently wash a chip material in a short time and the washed chip material can be taken out in a short time without a complicated procedure. However, since it is not a pressure device, the maximum washing temperature is 100° C. and reduction in the washing time and enhancement of the quality of the recovered substrate are thus limited. If an attempt is made to modify the above-mentioned chip washing device into a pressure vessel using a standard arrangement, the thickness of the flat end plate in the base needs to be a few centimeters. In the case where the end plate in the base is made in a hemispherical shape, although the end plate can be thin, a large dead space is formed in the base and not only does the size of the device increase but also the operability becomes very poor.

BRIEF SUMMARY OF THE INVENTION

The present invention has been carried out in view of the above-mentioned circumstances, and it is a first object of the present invention to provide a method of recovering large quantities of a synthetic resin or an organic acid ester of cellulose (hereinafter, termed 'synthetic resin, etc.') and, in particular a polycarbonate substrate or a polyester substrate, with a quality that allows it to be reused in the original application, at a low recovery cost and in a stable manner. It is a second object of the present invention to provide a pressure type washing device that can be used in the above-mentioned recovery method.

In accordance with a first aspect of the present invention in order to achieve the above-mentioned objects, a method of removing a layer of material from a synthetic resin or an organic acid ester of cellulose, comprising: washing the layer from the substrate with an aqueous alkali solution with a temperature of at least 105° C., and then washing the alkali solution from the substrate.

With regard to the above-mentioned synthetic resins, aromatic polycarbonates, aromatic polyesters and polypyromellitic imides are preferred, and bisphenol A polycarbonate, poly(ethylene terephthalate) and poly (ethylene naphthalate) are particularly preferred.

With regard to the organic acid esters of cellulose, cellulose acetate, cellulose acetate butyrate and cellulose acetate propionate are preferred.

In accordance with a second aspect of the present invention, a method of recovering a polycarbonate substrate is provided which comprises the steps of:

providing a polycarbonate substrate having at least one functional layer thereon, the functional layer, selected from the group consisting of a colarant containing layer, a metal reflective layer, a photosensitive layer, a protective layer an adhering layer and an undercoat layer;

applying an effective amount of an aqueous alkali solution with a pH of at least 10 and a temperature of at least 105° C. to substantially remove the functional layer from the polycarbonate substrate; and then washing the alkali solution from the substrate.

Furthermore, it is preferable to use the above-mentioned method of recovering a polycarbonate substrate comprising the steps of applying an aqueous alkali solution containing 0.1 to 20 wt % of a caustic alkaline and 0.001 to 10 wt % of a surfactant while stirring and then washing the alkali solution from the substrate and optionally drying. Moreover, with regard to the above-mentioned method of recovering a polycarbonate substrate, the washing step may comprise at least two steps of applying a different fresh aqueous alkali solution, or a step of washing at 100° C. or below may be added before or afterwards. The method of recovering a polycarbonate substrate may comprise, followed by applying an aqueous alkali solution, a step of washing with an aqueous solution containing 0.1 to 10% of a peroxide, preferably a slightly acidic aqueous hydrogen peroxide solution.

A third aspect of the present invention relates to a method of recovering a polyester substrate including the steps of:

providing a polyester substrate having at least one functional layer thereon, the functional layer, selected from the group consisting of a silver halide photosensitive layer, a silver containing layer, a protective layer, and an undercoat layer;

applying an effective amount of an aqueous alkali solution with a pH of at least 10 and a temperature of at least 105° C. to substantially remove the functional layer from the polyester substrate; and then washing the alkali solution from the substrate.

The method of recovering a polyester substrate may include a step of pre-cutting if necessary a polyester substrate having at least one functional layer thereon, into chips and then treating them with a 0.1 to 3 wt % aqueous alkali solution of a temperature of 105° C. to 150° C.

A fourth aspect of the present invention relates to a device that can desirably carry out the above-mentioned recovery method and, in particular, a pressure type washing device comprising a pressure vessel comprising a longitudinal cylindrical body having a circular cross-section, an end plate connected to the top of the cylindrical body, an inverted end plate connected to the lower part of the cylindrical body in a manner such that its convex part faces upwards, the end plate having a lid and a washing liquid inlet, the lid allowing a chip material to be fed through, a chip outlet provided in the lower part of the body, a strainer plate traversing the cylindrical body provided in the lower inner part of the body, a stirring blade provided above the strainer plate in close proximity to the strainer plate, and a stirring shaft for the stirring blade provided so as to run through the inverted end plate.

The pressure type washing device of the present invention preferably has an end plate or an inverted end plate in the shape of an dished head. The ratio of the diameter D to the height H of the end plate or the inverted end plate is not particularly limited, but it is preferable that D:H=1:0.08 to 0.12

The above-mentioned pressure type washing device preferably includes a hollow core for filling the space formed between the strainer plate and the lower end plate and a pressure equalizing pipe for equalizing the pressure between the core and the pressure vessel.

Furthermore, the pressure type washing device of the present invention preferably includes a chip outlet having a clutch door connected to the cylindrical body, the clutch door being arranged so that a body ring forming a circular flange connected to the cylindrical body side and an end plate ring forming a circular end plate flange of an outlet cover face each other, the two rings being fixed by being clamped by an external ring.

The device of the present invention preferably includes a strainer plate which forms is a small angle of 10 to 30 degrees to a plane perpendicular to the central axis of the vessel. It is also preferable to provide the strainer plate with small pores having a diameter of 1 to 10 mm and an interval between the pore ends of 2 to 10 mm.

The cylindrical body preferably comprises a jacket for heating and cooling.

The ratio of the inner diameter D to the inner height H of the cylindrical body is not particularly limited, but it is preferable that D:H=1:1 to 2.5.

It has been difficult to obtain recyclable high quality synthetic resin, etc. (no foreign matter detected, no depolymerization) in a short time at low treatment cost using the various recovery methods and recovery devices known in the art but, in accordance with the recovery method of the present invention, synthetic resin substrate, etc. can be recovered for the first time with a high quality that allows it to be reused in the original application.

In accordance with the method of recovering synthetic resins, foreign matter on the substrate can be removed with a reduced amount of caustic alkali in a reduced treatment time at a lower cost. Furthermore, depolymerization of the substrate can be suppressed; it is also possible in some cases that low molecular weight components are removed so increasing the degree of polymerization of the substrate, and it is thus possible to easily recover reusable good quality polycarbonate substrate at a comparatively low cost.

Moreover, in accordance with the process of the present invention, merely by providing a cathode in the treatment liquid comprising an aqueous alkali solution and applying a low voltage (10 volts or below) the silver can be recovered from a natural resin or a synthetic resin containing silver or a silver salt without using any additive known in the art and the formation of silver-containing scale on the treatment vessel can be suppressed.

DETAILED DESCRIPTION OF THE INVENTION

Figure 1:
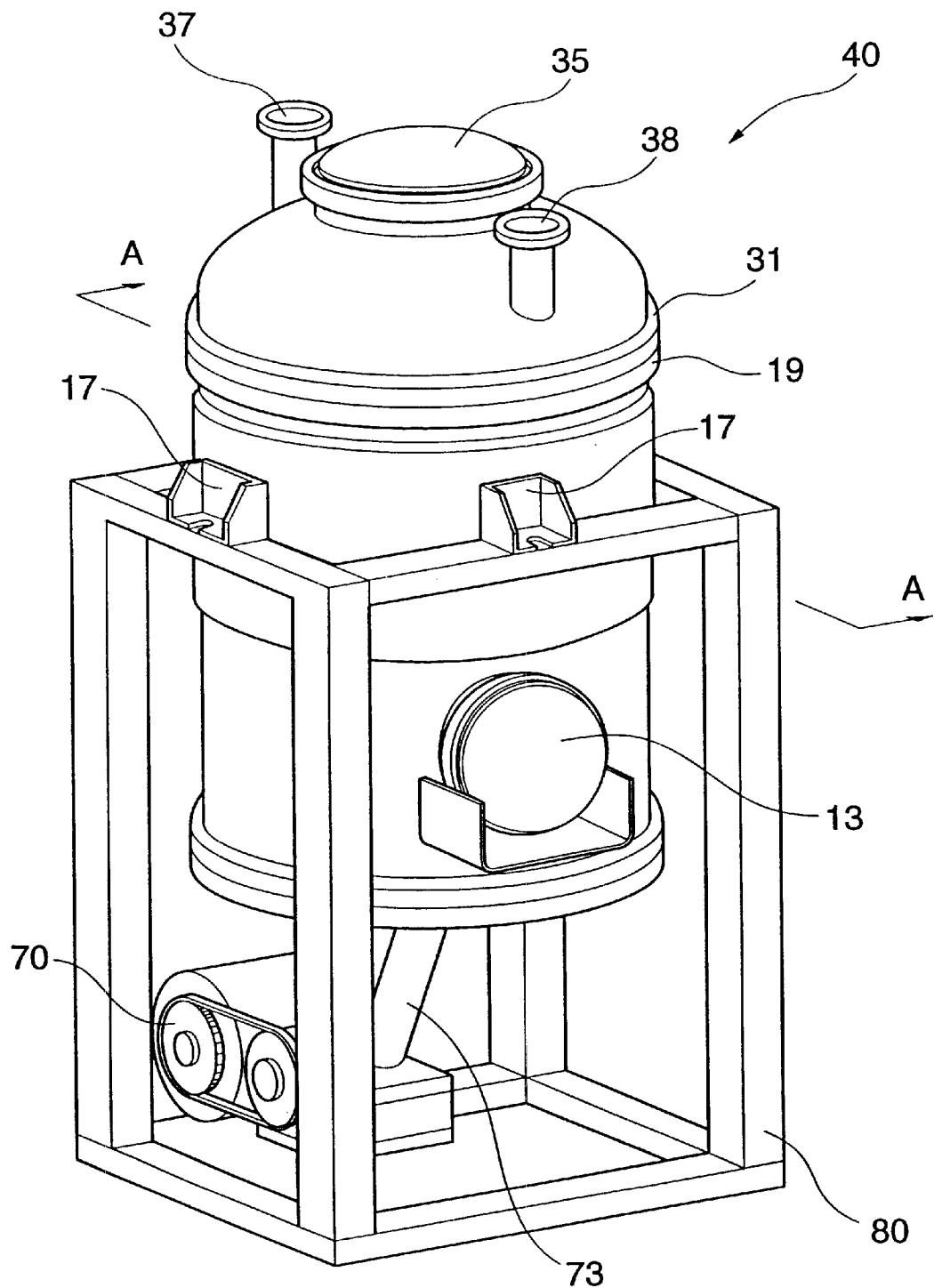
FIG. 1 is a schematic oblique view of one embodiment of the substrate recovering device related to the present invention.

The present invention is explained in detail below, firstly the recovery method and then the washing device.

In accordance with the recovery method of the present invention, a layer of a different material and attached foreign matter can be selectively removed from a substrate made from a synthetic resin, etc. by utilizing the hydrophobic properties and chemical resistance of the substrate. Since substrates made from synthetic resin, etc. have ester bonds, they tend to be easily hydrolyzed when heated in an aqueous sodium hydroxide solution having a high concentration of, for example, 7 to 30 wt %. The present inventors have found that the hydrolysis and dissolution of the substrate can be avoided almost completely by reducing the concentration of the aqueous sodium hydroxide solution so enhancing the effect of the hydrophobic properties of the synthetic resin, etc. In addition, the present inventors have found that the rate-determining step in the removal of a layer of a different material (may be multiple layers) provided on the substrate made from a synthetic resin, etc. is surprisingly a step in which the layer swells, and the swelling can instead be promoted by reducing the concentration of the alkali. The present inventors have also found that foreign matter attached to the substrate made from a synthetic resin, etc. can be substantially completely dissolved or completely peeled off and removed by controlling the temperature of the aqueous alkali solution as the swelling takes place so that it is above 100° C., and preferably 105 to 150° C. (this means at least 105° C. and at most 150° C. in the present invention).

The recovery method and the washing device of the present invention can be applied widely to the recovery of thermoplastic resins. With regard to the thermoplastic resins, synthetic resins, organic acid esters of cellulose, etc. can be cited as typical examples, and the synthetic resins are represented by aromatic polyesters, aromatic polycarbonates, polyimides, polyamides, etc. and the organic acid esters of cellulose are represented by cellulose acetate, cellulose butyrate and mixed esters thereof. In this invention polycarbonates mean aromatic polycarbonates and polyesters mean aromatic polyesters.

The waste polycarbonate substrate used in the present invention is material which has been used as a disc substrate in, for example, CD-ROM, CD-R, DVD and DVD-R, and there are vapor deposition layers and coating layers on the surfaces thereof. By increasing the washing temperature in the aqueous alkali solution to about 105° C. or above and reducing the concentration of caustic alkali even a short washing treatment can almost completely remove the colorant and foreign matter on the substrate surface while suppressing depolymerization inside the substrate. Furthermore, a method in which the concentration of alkali solution is changed according to the degree of removal of foreign matter by the alkali solution, that is to say, an improved method employing a multiple washing process using different fresh alkali solutions is also useful. In the multiple washing process the number of washing steps can be 2 to 4.

Polycarbonates are poly(carbonate esters) having a carbonate ester bond in the main chain and are generally amorphous linear polymers. Aromatic polycarbonates are preferably used, and bisphenol A polycarbonate obtained by reacting 2,2'-bis(4-hydroxyphenyl)propane (bisphenol A) with phosgene or diphenyl carbonate is particularly preferred. Another aromatic polycarbonate disclosed in Japanese Patent Application Laid-open No. 7-165978 can also be used.

With regard to the functional layers provided on the polycarbonate substrate that is to be recovered, they are layers having at least one function that are useful as various types of recording material, and colorant-containing layers, reflective metal layers, photosensitive layers, protective layers, undercoat layers, adhering layers, etc. can be cited.

The colorant-containing layers generally contain a cyanine type colorant, and the reflective metal layers mostly comprise a vapor deposition layer of gold or silver having good reflection characteristics or inexpensive aluminum. With regard to the photosensitive layers, silver halide emulsion layers or a non-silver salt photosensitive layers such as photopolymer layers or photosensitive diazo compound layers can be used.

With regard to the protective layers, undercoat layers, etc. thermoplastic acrylic esters having good optical characteristics and copolymers of an acrylic acid ester monomer, a methacrylic acid ester monomer, etc. can be used. The protective layers further contain benzophenone type compounds, benzotriazole type compounds or salicylic acid type compounds such as phenyl salicylate as ultraviolet absorbing agents, and also ultraviolet curing agents. With regard to the undercoat layers, cured gelatin, a thermally curable resin, etc. can be used.

The polycarbonate substrate is used in sheet or film form. For example, it is used as film having a thickness of 50 to 200 $\mu$m or as discs having a thickness of 0.5 to 2 mm. The diameter thereof is usually 12 cm.

With regard to representative examples of the polyester substrate that can be recovered by the method of the present invention, polyesters used as a base film for photographic photosensitive materials can be cited. Polyesters generally have excellent physical strength, water resistance and heat resistance. Since their surface is hydrophobic, a hydrophilic photosensitive layer is generally coated after providing an undercoat layer on the surface of the polyester film base, and subsequently a single hydrophilic layer or multiple hydrophilic layers are provided. The single undercoat layer is usually formed by coating a mixture containing a compound that makes the actual surface of the substrate swell, a water soluble polymer and a polymer latex. When the undercoat layer comprises multiple layers, a copolymer formed from vinylidene chloride, vinyl chloride, etc. is coated as a first layer and a hydrophilic polymer such as gelatin is coated as a second layer to provide hydrophilic properties. A hydrophilic photosensitive layer is provided on such an undercoat layer and they are bonded strongly by a gelatin curing agent.

Since the aqueous alkali solution of the present invention does not contain a large amount of water soluble organic solvent, the gelatin undercoat layer can swell and be removed quickly and the aqueous solution can also be easily removed by washing with water after the treatment.

The polyesters that can be recovered by the recovery method of the present invention are generally amorphous linear polymers having ester bonds in the main chain and, in particular, carboxylic acid ester bonds. With regard to preferable examples, aromatic polyesters can be cited and there are, in detail, poly(ethylene terephthalate), poly(ethylene naphthalate), poly(propylene terephthalate), etc. Polyesters that can be used as a substrate for silver halide photographic photosensitive materials include those disclosed in Japanese Patent Application Laid-open No. 6-175285, etc.

The representative film thickness of the photographic polyester base is 10 to 200 $\mu$m, and usually 80 to 180 $\mu$m.

The method of recovering a substrate comprising a synthetic resin, etc. is explained below.

Washing Step or Removing Step

The recovery method of the present invention comprises, as an essential step, removing a layer of material from a synthetic resin, etc. by treating the layer with an aqueous alkali solution, as an important step, washing the alkali solution from the substrate, and, as a preferable step, drying.

The aqueous alkali solution can be prepared using a caustic alkali. The caustic alkali here denotes the hydroxide or carbonate of an alkali metal and there are, for example, lithium hydroxide, sodium hydroxide, sodium carbonate, potassium carbonate, etc. In addition to the caustic alkali, a surfactant and a peroxide may be used in combination as necessary.

The washing step using an aqueous alkali solution in the present invention uses an alkali solution preferably having a pH of 10 to 14. The pH may be controlled using a pH meter or a conductivity meter instead of the pH meter. The concentration of sodium hydroxide may generally be 0.1 wt % or above, but when a polycarbonate substrate is washed it is preferably 0.1 to 20 wt %, and more preferably 0.1 to 10 wt %. When a polyester substrate is washed it is preferably 0.1 to 4 wt %, and more preferably 0.1 to 3 wt %.

If the same level of pH can be obtained, it is preferable to use a caustic alkali having a low ionic strength.

The temperature of the washing step may be about 105° C. or higher. When treating a polycarbonate substrate it is preferably 105 to 130° C. When treating a polyester substrate it is preferably 105 to 150° C., and more preferably 110 to 140° C.

In the washing step "to substantially remove" means to remove not less than 50wt % of the functional layer or layers from the substrate.

With regard to the surfactant, there are nonionic surfactants, anionic surfactants and cationic surfactants, and the surfactants used in the present invention are preferably nonionic surfactants and anionic surfactants. With regard to the nonionic surfactants, poly(ethylene glycol ether) types, in particular, poly(ethylene glycol ethers) of higher alcohols, poly(ethylene glycol ethers) of alkylphenols, etc. are preferably used. With regard to the anionic surfactants, for example, sodium alkylbenzenesulfonates, etc. can be cited and they may preferably be used in combination with a nonionic surfactant. The concentration of surfactant is 0.001 to 5 wt %, and preferably 0.01 to 1 wt %. The surfactants are useful for removing colorants or fine foreign matter attached to the starting waste or colorants or fine foreign matter reattached thereto after removal with a treatment liquid.

The peroxides used in the present invention include oxides having an —O—O— bond and oxides of polyvalent metals. Hydrogen peroxide, salts thereof, ozone, persulfuric acid, salts thereof, etc. are preferable and hydrogen peroxide is most preferable. The concentration of peroxide is preferably 0.1 to 10 wt %, and the temperature of the aqueous peroxide solution is preferably 65 to 95° C., and more preferably 80 to 90° C. The peroxides are useful for completely removing residual metals and dyes. An aqueous hydrogen peroxide solution has a pH of 2 to 5. This acidic aqueous solution also removes a residual aqueous alkali solution from the substrate.

In order to remove the coating agents and dyes, an organic solvent such as, for example, methanol, ethanol, isopropyl alcohol, glycerin or methyl Cellosolve can be used additionally.

The washing liquid is usually heated using steam at 1 atm. or higher, hot water, a burner or an electrical heater. It is preferable to use a pressure type washing device and a washing device having high pressure resistance (0.2 to 0.5 MPa=2 to 5 kgf/cm$^2$) is particularly preferably used. Such a washing device is explained in detail below.

The washing time is 5 to 150 minutes (at least 5 minutes and at most 150 minutes), preferably 5 to 100 minutes, and more preferably 10 to 60 minutes.

The washing step using an aqueous alkali solution of 105° C. or above can be carried out in more than one step, and is preferably carried out in 2 or 3 steps by using different, usually fresh, alkali solutions. An alkali washing step at 100° C. or below may be added. By employing two alkali washing steps comprising a short alkali washing step and a subsequent alkali washing step to remove foreign matter that has become attached during the first washing, a reusable high quality synthetic resin, etc. can be recovered in a relatively short time. When carrying out a treatment with different aqueous alkali solutions using more than one step it is preferable to change the alkali concentration of the aqueous alkali solutions, the temperature and the chip density in each step. Straining and water washing steps may be carried out between the multiple alkali washing steps as necessary.

When a substrate made from a synthetic resin, etc., comprising a silver-containing layer is treated with an aqueous alkali solution, the silver is dissolved in the slurry and a silver-containing scale is formed on the wall of the treatment vessel. The use of a reducible compound such as a halogenated compound or a saccharide in order to prevent such formation is known.

In the method of the present invention it is possible to recover silver and prevent a silver-containing scale from becoming attached to the wall of the treatment vessel or a strainer plate such as a punching plate or a filter plate by providing a cathode in the treatment liquid and adjusting the applied negative voltage to about 1 to 10 volts, and preferably 2 to 5 volts.

When treating a substrate made from a synthetic resin, etc. by the method of the present invention, it is preferable to firstly sort the substrate that is to be treated, pre-cut the substrate made from a synthetic resin, etc. into chips having an appropriate size and then subject it to the treatment. In the case of a polycarbonate substrate it is preferable to crush it into a size of 1 mm to 10 cm, and more preferably into a particle size of 1 mm to 10 mm. In the case of a polyester substrate it is preferable to crush it into a size of 5 mm to 3 cm. Wet crushing may be employed for this crushing. For example, a method disclosed in Japanese Patent Application Laid-open No. 7-286064 can be used.

Water Washing Step

The water washing step is a step in which the alkali solution is washed from the substrate. The chip material treated with the alkali solution is conveniently washed with water in order to eliminate the residual alkali solution or slurry or to remove foreign matter generated by dissolving or finely grinding the undercoat layer and the layer above it. The washing water may contain an acidic material in order to neutralize the alkali. It is also possible to wash with an organic solvent, for example, an alcohol such as ethanol or methanol, a ketone such as acetone, toluene or petroleum ether or a solution containing an organic solvent subsequent to the treatment with a caustic alkali or the water washing, followed by drying.

Drying Step

The drying step is a step in which the treated chip material is heated at 50 to 200° C., and preferably 80 to 120° C. until the water content becomes preferably 2 wt % or below, and more preferably 1 wt % or below. When the treated chip material is to be remelted to give recycled pellets, it may be vacuum-dried in a pressure vessel so as to reduce the water content to 0.2 wt % or below.

The pressure type washing device of the present invention is explained in detail by reference to the attached drawings.

Figure 2:
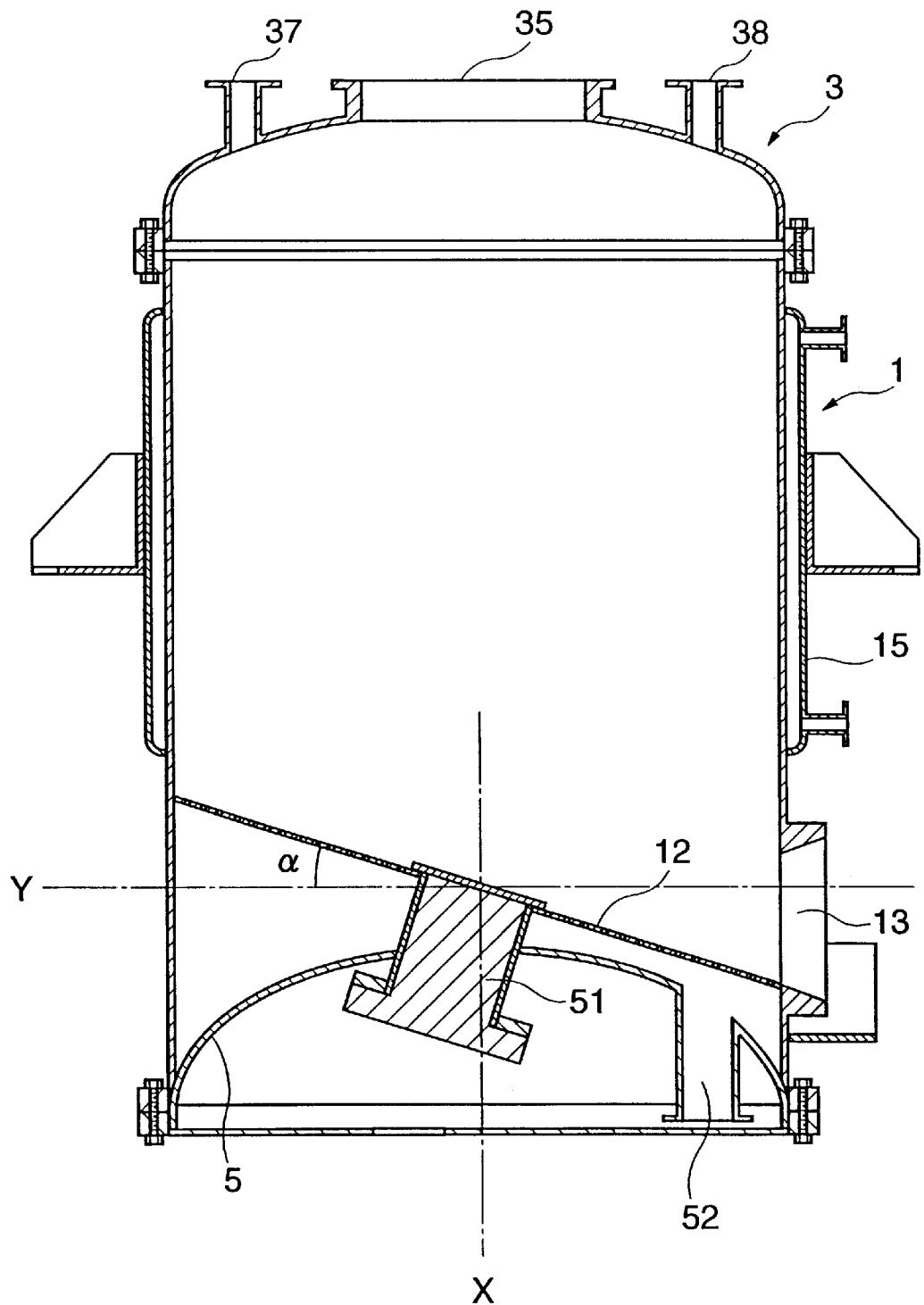
FIG. 2 is a magnified schematic cross-sectional view at line A—A in FIG. 1.
Figure 3:
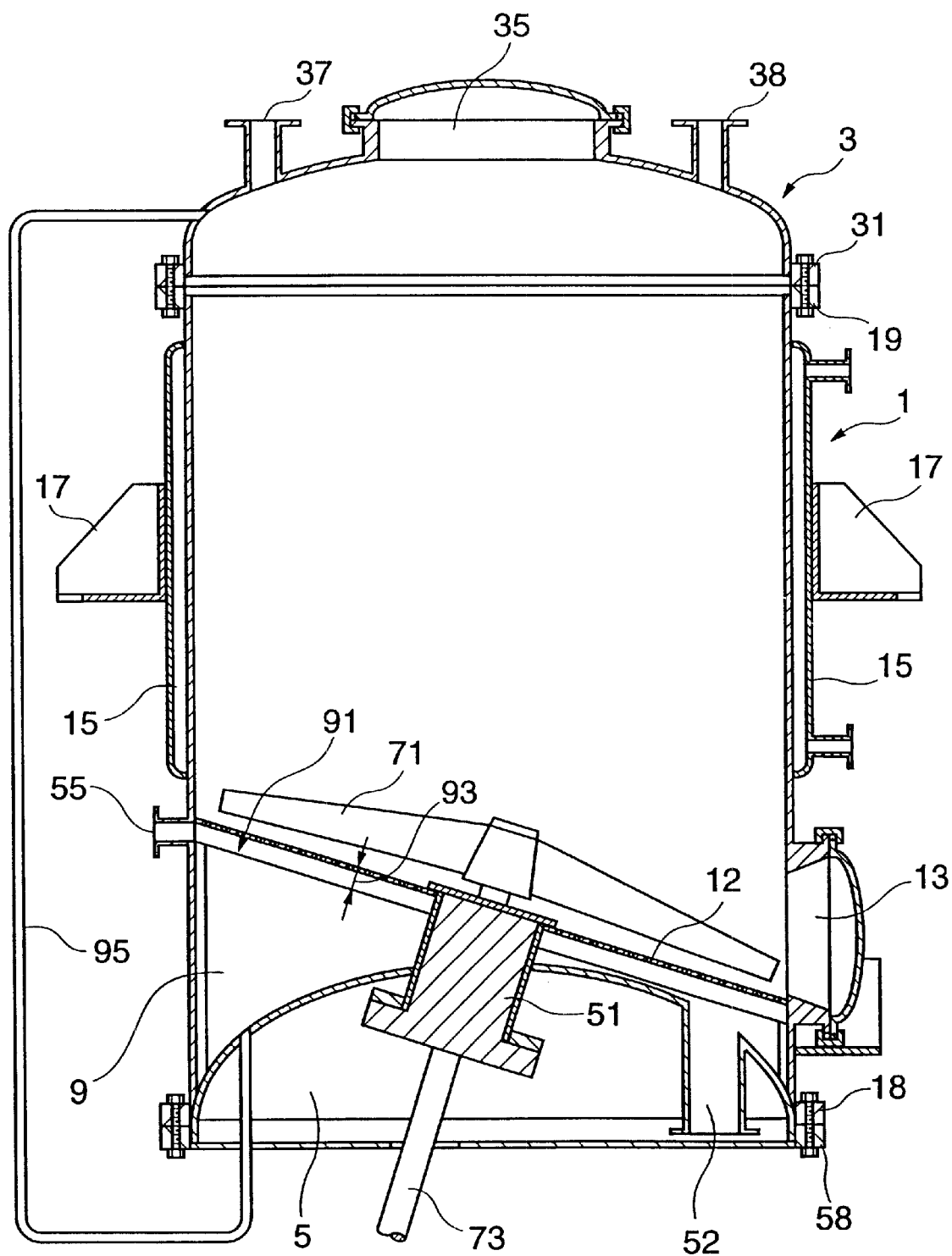
FIG. 3 shows one embodiment having a core at the bottom of the vessel.
Figure 4A:
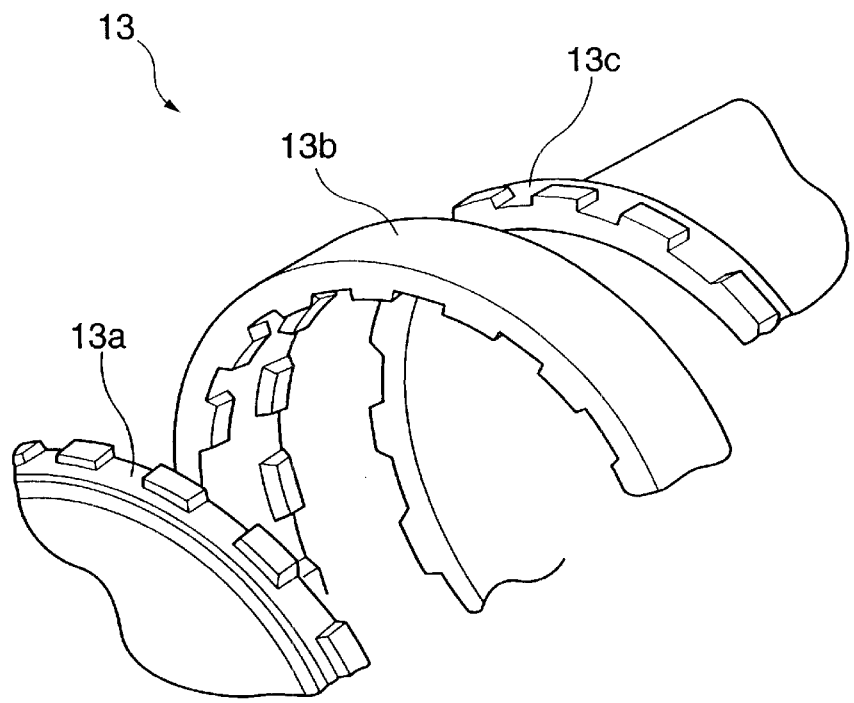
FIG. 4A and FIG. 4B show one embodiment of a clutch door.
Figure 4B:
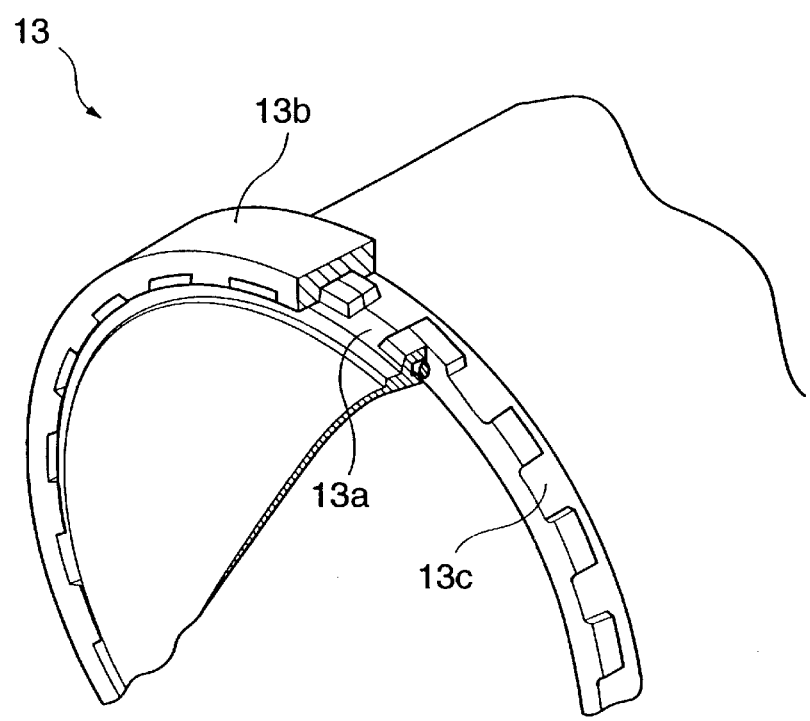

In FIGS. 1 to 3, 1 denotes a cylindrical body, 3 denotes an end plate, 5 denotes an inverted end plate, 9 denotes a core, 12 denotes a strainer plate, 13 denotes a chip outlet, 13A, 13B and 13C denote a clutch door, 15 denotes a jacket, 17 denotes a support, 18 denotes a lower flange of the cylindrical body, 19 denotes an upper flange of the cylindrical body, 31 denotes an end plate flange, 35 denotes a lid, 37 and 38 denote washing liquid inlets, 40 denotes a pressure vessel, 51 denotes a stirring shaft space, 52 denotes a liquid drainage tube, 55 denotes a steam inlet tube, 58 denotes an inverted end plate flange, 70 denotes a stirring blade drive mechanism, 71 denotes a stirring blade, 73 denotes a stirring shaft, 80 denotes a frame, 91 denotes an upper face, 93 denotes a gap and 95 denotes a pressure equalizing tube.

In FIGS. 1 and 2, the pressure type washing device comprises a pressure vessel 40 fixed to a frame 80 and a stirring blade drive mechanism 70. The pressure vessel 40 is a longitudinal cylinder having a circular cross-section, an end plate 3 is provided on the top of a cylindrical body 1, a lid 35 is provided in the central area of the end plate 3 for feeding a chip material, etc., and the lid 35 can be opened and closed by means of a clutch door. Washing liquid inlets 37 and 38 are also provided in the end plate 3. An inverted end plate 5 having an upwardly convex shape is connected to the bottom of the pressure vessel 40. A stirring shaft 73 of the stirring blade drive mechanism 70 is provided around the central area of the inverted end plate 5 so as to preferably run through it in a manner such that the stirring shaft 73 is tilted relative to the central axis X of the pressure vessel 40. The cylindrical body 1 and the end plate 3 are connected to each other preferably by a cylindrical body upper flange 19 and an end plate flange 31 respectively provided thereon. The cylindrical body 1 and the inverted end plate 5 are also connected to each other preferably by a cylindrical body lower flange 18 and an inverted end plate flange 58 respectively provided thereon.

The pressure type washing device of the present invention has preferably an end plate or an inverted end plate which is either an ellipsoidal dished head or an approximate ellipsoidal dished head. A height of the end plate or the inverted end plate is preferably 8 to 12% of the inner diameter of the end plate or the inverted end plate.

A chip outlet 13 is provided in the lower part of the cylindrical body 1 of the pressure vessel 40 of the present invention, and a strainer plate 12 traversing the body is provided in the inner lower part of the cylindrical body 1. The strainer plate 12 has a large number of small pores, and it is preferable for the small pores to have a diameter of 1.5 to 6 mm and be provided at intervals of 1 to 10 mm between the ends of the pores. The diameter of these small pores may be uniform in the thickness direction of the strainer plate 12 but in a preferred embodiment the diameter of the small pores increases from a depth approximately corresponding to their diameter such that on the reverse side of the strainer plate 12 their diameter is about twice that on the front side. Blockage of the pores by the chip material can be suppressed by increasing the diameter of the pores towards the reverse side.

The strainer plate 12 is preferably provided not perpendicular to the central axis X of the vessel 40 but in a manner such that there is a small angle to the perpendicular plane of 10 to 30 degrees. It is more preferable for the lowest part of the strainer plate 12 to coincide with the lower end of the chip outlet 13 so that the washed chip material can easily be discharged.

In order to relieve the expansion and contraction distortion due to changes in the temperature of the washing liquid the strainer plate 12 is preferably not in the form of a single circular or elliptical shape but made from a combined structure of several portions divided in the radial direction.

FIG. 3 shows one embodiment in which a hollow core 9 is provided so as to closely adjoin the strainer plate 12 and to have its upper face below the strainer plate 12 and generally parallel thereto. The core 9 and the vicinity of the end plate 3 of the pressure vessel 40 are preferably connected by a pressure equalizing pipe 95.

The upper face 91 of the core 9 forms the bottom face of the washing space together with the body of the stirring shaft space 51, and the strainer plate 12 is provided above the bottom face and generally parallel thereto with a gap 93 between them. As mentioned above, the strainer plate 12 comprises a large number of small pores which run through the strainer plate 12 or run through it and have a diameter at the lower face larger than that at the upper face. A stirring blade 71 is provided above the strainer plate 12 so as to closely adjoin it and is fixed to and rotated by the stirring shaft 73 which is provided so as to run through the inverted end plate 5 and the strainer plate 12 and is driven by the motor of the stirring blade drive mechanism 70 via a transmission. The chip outlet 13 is provided in the cylindrical body 1 of the pressure vessel 40 at a position corresponding to the lowest part of the strainer plate 12 so that the lower end of the chip outlet 13 coincides with the upper face of the strainer plate 12. The operation of opening and closing the chip outlet 13 is preferably carried out by means of a clutch door. A washing liquid drainage tube 52 is provided in the inverted end plate 5, and a steam inlet tube 55 is provided in the cylindrical body 1 so that steam can be blown in between the core upper face and the strainer plate 12.

The pressure vessel 40 is a vessel that can withstand the pressure (about 2 to 5 kgf/cm$^2$)necessary to maintain the washing liquid in a liquid state at a temperature of more than 100° C., preferably 105° C. to 150° C., and more preferably 105° C. to 130° C. The lid 35 that can be used for feeding a chip material, etc. can preferably be closed hermetically by a clutch door. It is preferable that the pressure vessel 40 comprises a jacket 15 for circulating, for example, pressurized steam, cold water, etc. for heating and cooling. The shape of the vessel 40 is not particularly limited as long as the above-mentioned conditions are satisfied, but it is preferable to use one having a shape with a ratio of the inner diameter D to the inner height H of D:H=1:1 to 2.5 in terms of the efficiency of stirring the contents, temperature control, etc. A window for illuminating and observing the inside of the pressure vessel 40 may be provided in the lid 35 or in the cylindrical body 1.

Supports 17 for fixing the entire pressure vessel 40 to the frame 80 are provided around the central part of the cylindrical body 1 in the circumferential direction.

The angle by which the strainer plate 12 is tilted relative to the central axis X is not particularly limited, but it is preferable for the strainer plate 12 to be tilted so that a small angle α of 10 to 30 degrees is formed between the strainer plate 12 inside the pressure vessel 40 and the plane Y perpendicular to the central axis X of the pressure vessel 40. When the small angle α is smaller than the above-mentioned range the discharge rate of the washed chip material becomes slow, and when it is larger than the above-mentioned range the effect of stirring the chip material during washing is reduced and the washing time tends to become longer. Since the cross-section of the pressure vessel 40 is circular and the strainer plate 12 is arranged as above-mentioned, the cross-section of the strainer plate 12 is circular or elliptical.

The strainer plate 12 functions to retain the washed chip material thereon and drain off the contaminated washing liquid and washing water after the washing step is complete. The size and density of the small pores provided in the strainer plate 12 may therefore be determined appropriately according to the size of the chip material and the amount of drainage liquid, but the small pores generally have a diameter of 1 to 10 mm and preferably of 1.5 to 6 mm and an interval between the pore ends of 2 to 10 mm.

The stirring blade 71 functions to adequately disperse the chip material in the washing liquid during the washing step and to discharge the washed chip material through the chip outlet 13 after the washing and straining steps are complete. The stirring blade 71 is therefore provided so as to closely adjoin the strainer plate 12 and preferably has the function of circulating the contents upwards inside the pressure vessel 40 during the washing step. The shape of the stirring blade 71 is preferably of the fan turbine type, the curved fan turbine type, the angled fan turbine, the Faudler type, etc., but another shape may be employed. The length of the stirring blade 71 is not particularly limited, but it is preferable that the forward ends of the stirring blade 71 are as close to the inner side wall of the pressure vessel 40 as possible in order to make it easy to discharge the washed chip material.

The stirring shaft 73 is attached to the stirring shaft space 51 by a liquid seal, and there may be an appropriate gap from the strainer plate 12. FIGS. 1, 2 and 3 show an embodiment in which the stirring blade 71 is driven from below the pressure container 40, but it may be driven from above by providing the stirring shaft 73 so as to run through the top cover 3 or the cylindrical body 1 of the pressure vessel 40.

The lid 35 and the chip outlet 13 may be opened and closed by a sliding system instead of the clutch doors shown in FIG. 3.

There is a case in which the small pores of the strainer plate 12 become blocked due to the removed materials while continuously washing the chip materials using the above-mentioned pressure type washing device. In this case a washing water tube may be provided in the liquid drainage tube 52 in order to remove the material blocking the small pores by flushing washing water upwards from the lower side of the strainer plate 12. It is also possible to backflush washing water into the vessel 40 via a washing liquid drainage valve.

The pressure vessel of the present invention is preferably designed as a Category I pressure vessel according to the Japanese Industrial Standard (JIS). The Class I pressure vessel here means a pressure vessel having a design temperature of less than the material creep region and a design pressure of less than 100 MPa (1,000 kgf/cm$^2$). Detailed shapes, sizes and materials of the cylindrical body, the end plate, the jacket and the opening used for building the pressure vessel are prescribed in the Japanese Industrial Standard.

In the United States the pressure vessel is made according to the AMSE Boiler and Pressure Vessel Code, Section VIII Pressure Vessels, Division I.

A method of washing a polycarbonate chip material, etc. comprising a recording layer using the pressure type washing device having about 2 m diameter of the body is explained below.

The chip material that can be washed using the washing device of the present invention is not particularly limited as long as it is made into the form of chips by cutting, crushing or grinding beforehand as necessary. With regard to examples of the chip material that can be washed, contaminated or coated plastic films, sheets, other moldings, etc. can be cited. The size of the chip material is not particularly limited; it is generally about 100 mm square or less, and particularly preferably about 30 mm square or less.

With regard to chip materials that can be particularly effectively washed using the washing device of the present invention, for example, various types of photographic photosensitive material comprising a photosensitive layer applied on a substrate made from a cellulose type plastic, a polyester or another plastic, magnetic tapes and magnetic discs comprising a magnetic material layer on the above-mentioned substrates, optical discs comprising a metal or colorant layer applied on the above-mentioned substrates, printing materials comprising a metal or colorant layer or a photosensitive resin layer applied on the above-mentioned substrates, empty plastic containers contaminated by their contents, etc. can be cited.

Firstly, the outlet 13 and the washing liquid drainage valve (not illustrated) are closed, the chip material that is to be washed is fed to the pressure vessel 40 through the lid 35 and the lid 35 is hermetically sealed. A predetermined amount of washing liquid having a predetermined composition is then introduced via the washing liquid inlets 37 and 38 and the valves (not illustrated) are closed. Pressurized steam is then supplied to the jacket 15 of the pressure vessel 40 so as to heat the inside while rotating the stirring blade 71, and pressurized steam is blown into the pressure vessel 40 so as to raise the internal temperature to 105° C. to 130° C. The rotational rate is gradually increased and washing is carried out for a predetermined time while stirring at a predetermined rotational rate. After washing is complete, the washing liquid drainage valve is opened so as to drain the washing liquid through the liquid drainage tube 52. The flow rate of the drained washing liquid is controlled so that the temperature of the liquid mixed with a predetermined amount of ground water (18° C.) is 95° C. or below. The first washing step is complete at this stage, but another washing step may be carried out by changing the composition of the washing liquid if necessary. The dirt attached to the chip material and the applied layer on the chip substrate are removed and dissolved in the washing liquid or made into fine particles during the washing step and discharged together with the washing liquid through the liquid drainage tube 52, and the washed chip material remains on the strainer plate 12.

After the washing step is complete, the chip material is washed with water in the same manner as mentioned above. The used washing water is drained through the washing liquid drainage tube 52 and the chip material washed with water remains on the strainer plate 12. The liquid temperature during the washing with water is maintained at a predetermined level as necessary.

The chip material attached to the inner wall of the pressure vessel 40 is washed by showering it with water if necessary. After the water washing step is complete, the chip material is well strained, the chip outlet 13 is opened and the washed and water-washed chip material is discharged through the chip outlet 13 while rotating the stirrer at a low speed.

Since the chip washing device of the present invention has the above-mentioned arrangement, the chip material can be washed and washed with water effectively, the used washing liquid and the used washing water can be drained easily, and the water washed chip material can be discharged from the vessel smoothly in a short time with less labor.

The pressure type washing device of the present invention has the following advantages. (1) Since washing is carried out at a temperature of 105° C. or above, the amount of chemical used as a washing agent can be decreased and the washing time can be reduced. (2) Since the amount of chemical used is small the material can simply be washed with water. (3) The amount of residual chemical can be reduced to a trace amount and a high quality and stable resin can be recovered.

EXAMPLES

Examples of the present invention are illustrated below, but the present invention is in no way limited thereby. Examples 1 and 2 illustrate the recovery of polycarbonate and Examples 11 to 14 illustrate the recovery of polyester.

Example 1

CD-R discs having a polycarbonate substrate was cut into a size of about 1 to 5 cm and subjected to a polycarbonate substrate recovery and recycle treatment.

The CD-R disc waste comprised, on a substrate (12 cm diameter, 1.2 mm thick), a colorant layer, a silver reflective layer and a protective layer containing an ultraviolet absorber, etc. It was subjected to the treatments described below followed by washing with water and drying to give polycarbonate resin recovery sample No. 1 (see Table 1 for the treatment conditions).

(Stage 1) Removal of foreign matter attached during cutting

The chipped discs were mixed at a solid to liquid ratio of 1:1 with a mixed aqueous solution of 1 wt % each of a polyoxyethylene derivative (Emulgen A-500, Kao Corp.) and sodium alkylbenzenesulfonate as surfactants, and the mixture was stirred at 90° C. for 60 minutes.

(Stage 2) Removal of colorant, metal film and protective film (part 1)

The substrate was placed in a mixed aqueous solution (pH 13.5) of 1 wt % of a polyoxyethylene derivative nonionic surfactant and 3 wt % of sodium hydroxide and treated at 120° C. for 30 minutes.

(Stage 3) Removal of colorant, metal film and protective film (part 2)

Subsequent to the above-mentioned stage 2, the procedure of stage 2 was repeated with the same solution except that the concentration of sodium hydroxide was changed to 5 wt %.

(Stage 4) Removal of residual metal (silver), etc. by a peroxide solution

A treatment was carried out at 90° C. for 30 minutes using a mixed aqueous solution in which a mixed aqueous solution of 1 wt % each of a polyoxyethylene derivative agent and sodium alkylbenzenesulfonate as surfactants (the same solution as that in Stage 1) was mixed with hydrogen peroxide at an amount corresponding to 0.58 wt %, followed by washing with water and drying.

Quality Evaluation (1) Degree of coloration of recovered chip sample (visual evaluation)

****: Coloration hardly detected

***: Slight coloration but acceptable.

**: Coloration observed

*: Coloration observed and could not be used.

(2) Evaluation of average molecular weight by viscosity measurement

The average molecular weight of virgin polycarbonate resin is 14,500±500. The acceptable average molecular weight is 14,000 or above. 0.7 g of the sample was dissolved in 100 ml of dichloromethane and the viscosity was measured at 20° C.

(3) Visual evaluation of the presence of foreign matter in the dichloromethane solution The presence of foreign matter should be at the same level or less than that of the virgin polycarbonate resin and, in particular, there should be no more than 2 particles having a diameter of 100 to 200 μm.

The recovered sample No. 1 obtained in Example 1 was of recyclable quality.

(1) Degree of coloration ****

(2) Average molecular weight 14500

(3) Presence of foreign matter Same level as or less than that of virgin resin

Example 2

The procedure of Example 1 was repeated except that the Stage 2 treatment time was extended to 60 minutes and the Stage 3 treatment was omitted to give polycarbonate resin recovered sample No. 2. Furthermore, the procedure of Example 1 was repeated except that the Stage 2 treatment was omitted and the Stage 3 treatment time was extended to 60 minutes to give recovered sample No. 3. The results of the quality evaluation of Sample Nos. 2 and 3 were as follows.

(1) The degree of coloration of the two samples was slightly inferior to that of Sample No. 1 and was evaluated as ***.

In evaluations (2) and (3), the results were the same as those of Sample 1.

It was found that the high temperature alkali treatment of the present invention can be carried out advantageously in several steps for the removal of foreign matter such as colorants for the same treatment time as the processes of the art.

Comparative Example 1

Comparative Samples A and B were obtained in the same manner as in Example 1 using the same CD-R disc waste as that used in Example 1 except that the concentrations of sodium hydroxide and surfactant and the treatment temperature and time were set as shown in Table 1. The results of the quality evaluation are given in Table 1.

TABLE 1

| Sample | | No. 1 | No. 2 | No. 3 | A | B |
|---|---|---|---|---|---|---|
| Stage 1 | As in Example 1 | — | — | — | — | — |
| Stage 2 | Concentration of sodium hydroxide (%) | 3 | 3 | None | 10 | 10 |
| | Concentration of surfactant (%) | 1 | 1 | None | 1 | 1 |
| | Treatment temperature | 120° C. | 120° C. | None | 90° C. | 90° C. |
| | Treatment time | 30 min | 60 min | None | 60 min | 30 min |
| Stage 3 | Concentration of sodium hydroxide (%) | 5 | None | 5 | 15 | 15 |
| | Concentration of surfactant (%) | 1 | None | 1 | 1 | 1 |
| | Treatment temperature | 120° C. | None | 120° C. | 90° C. | 90° C. |
| | Treatment time | 30 min | None | 60 min | 60 min | 30 min |
| Stage 4 | As in Example 1 | — | — | — | — | — |
| Quality Evaluation | (1) Coloration | **** | *** | *** | *** (fairly) | ** |
| | (2) Average molecular weight | 14500 | 14000 | 14000 | 14000 | 14000 |
| | (3) Presence of foreign matter | Same as virgin | Same as virgin | Same as virgin | Slightly more than virgin | More than virgin |

It was found that recovered polycarbonate resin samples 1, 2 and 3 and, in particular Sample 1, could be recovered by using a smaller amount of alkali substance with a reduced treatment time. In accordance with the method of the present invention, a high quality substrate can be recovered at a reduced treatment cost. The recovered sample can be reused together with virgin resin.

Example 11

Photographic photosensitive material manufactured by coating a silver halide emulsion layer and a protective layer on a poly(ethylene terephthalate) substrate having an undercoat layer of poly(vinylidene chloride) thereon was cut into chips having a size of 0.5 to 3 cm square and subjected to a recovery treatment.

The pressure type washing device of the present invention was used. The inner diameter of the cylindrical body was about 45 cm, a pressure-resistant hot water inlet was provided and the device was designed so as to withstand 0.5 MPa of steam.

First Washing Treatment

About 10 kg of the above-mentioned chip sample was placed in the pressure vessel, 35 l of a hot aqueous solution of sodium hydroxide having a predetermined concentration (see Table 2) and 2.0 g of a polyethylene glycol ether of a higher alcohol (Emulgen 106, Kao Corp.) were added, and the mixture was stirred at a predetermined temperature (see Table 2) for 15 minutes at a rotational rate of about 100 rpm.

The alkali solution was drained and the sample was well strained and then washed with water for 5 minutes.

Second Washing Treatment

The chip sample which had been subjected to the first caustic alkali treatment was mixed with 30 l of a hot aqueous solution of sodium hydroxide at a predetermined concentration (see Table 2) and 10.0 g of a polyethylene glycol ether of a higher alcohol, and the mixture was stirred at a predetermined temperature (see Table 2) for 40 minutes at a rotational rate of about 200 rpm. The treatment liquid was then drained and the sample was well strained.

Water Washing Treatment

The sample was washed with water by stirring for 10 minutes while pouring in water so as to remove the detached film and fine particles of foreign matter.

Drying Treatment

The washed and well strained chip material was taken out of the outlet and dried at 100° C. for 30 to 60 minutes.

Formation of Recycled Pellets and Recycled Film

The dried chip material was vacuum-dried and then heated and melted at 260 to 280° C. to give a polyester film, which was then cut to give recycled pellets. Alternatively, the film so obtained was biaxially stretched to give a recycled film.

Quality Evaluation

In the case where vinylidene chloride, etc. was used, the surface of the dried chip material was examined using ESCA and the presence of Cl atoms bonded to the organic carbon atoms was evaluated.

Confirmation of Removal of Undercoat Layer

The adequate removal of the undercoat layer was confirmed by soaking the treated chip material and standard poly(ethylene terephthalate) film pieces in a 1% aqueous solution of indigocarmine containing sulfuric acid and observing the wet state when the samples were moved up and down in the water. The film pieces repelled the water, and although water remained attached thereto the film pieces were not wetted.

In the case where a different type of organic compound such as a styrene butadiene polymer was used as an undercoat layer, the surface of the dried chip material was examined using ESCA ($C_{1S}$ orbital analysis) and the presence of the different type of organic compound was evaluated Confirmation of Removal of Foreign Matter in Recycled Film The presence of foreign matter in the recycled film and an actual PET standard film was examined using a magnifier lens (×100) and the amount of foreign matter in the recycled film was compared with that in the standard film and evaluated as follows.

I: Little (Can be used in practice)

II: Equal (Can be used in practice)

III: Much (Cannot be used in practice)

Comparative Example 11

The procedure of Example 11 was repeated except that the first caustic alkali treatment was carried out using 4 wt % of sodium hydroxide at 85° C. and the second caustic alkali treatment was carried out using 6 wt % of sodium hydroxide at 85° C. to give sample A'.

Comparative Example 2; Example Using Conventional Method

The procedure of Example 11 was repeated except that the first caustic alkali treatment was carried out using 4 wt % of sodium hydroxide by stirring at 85° C. for 20 minutes at a rotational rate of about 200 rpm with the water-washing treatment being carried out for 50 minutes, and the second caustic alkali treatment was carried out using 6 wt % of sodium hydroxide by stirring at 85° C. for 50 minutes at a rotational rate of about 200 rpm with the water-washing treatment being carried out for 50 minutes to give sample B'

In the aforementioned washing device, a stainless cathode (SUS-304) was placed below the strainer plate, and the treatment of each sample was carried out continuously by applying a negative voltage of 1 to 3 volts to the treatment vessel and, in particular, to the punching plate. It was observed that silver metal (purity 99%) adhered to the cathode and acicular silver could be recovered on a saran net covering the bottom of the cathode. When the normal treatment without a silver recovery was carried out continuously, it was observed that silver-containing scale was attached to the strainer plate and, in particular, around the small pores.

TABLE 2

| Sample No. | First caustic alkali treatment Conc. of sodium hydroxide (wt %) | Temp. (° C.) | Second caustic alkali treatment Conc. of sodium hydroxide (wt %) | Temp. (° C.) | ESCA surface analysis Cl detection* | Amount of foreign matter |
| --- | --- | --- | --- | --- | --- | --- |
| A' | 4 | 85 | 6 | 85 | Detected | Much |
| B' | 4 | 85 | 6 | 85 | Not detected | Equal |
| 11 | 0.7 | 105 | 1 | 120 | Not detected | Equal |
| 12 | 1 | 105 | 1 | 125 | Not detected | Equal |
| 13 | 1 | 100 | 2 | 120 | Not detected | Equal |
| 14 | 1 | 100 | 3 | 120 | Not detected | Equal |
| 15 | 0.2 | 110 | 3 | 125 | Not detected | Equal |
| 16 | 1 | 105 | 2 | 110 | Not detected | Equal |

For Samples B' and Nos. 11 to 16, the peak due to Cl was at the same level as that of the noise. It was found that the surface of the poly(ethylene terephthalate) had dissolved in Sample B'.

It was found from the results in Table 2 that poly (vinylidene chloride) and upper layer materials on the poly (ethylene terephthalate) substrate could be removed in a comparatively short time in comparison with the conventional methods by decreasing the concentration of sodium hydroxide to 0.2 to 3 wt % and carrying out the treatment at a temperature of higher than 100° C., and particularly 105° C. or higher.

Example 12

Used X-ray film comprising a poly(ethylene terephthalate) substrate was cut into chips having a size of about 0.5 to 1.5 cm square, and the chips were subjected to each of the treatments in the same manner as for Sample No. 11 of Example 11 to give a treated chip material (Sample No. 17) and a recycled film. The amount of foreign matter in the recycled film was slightly less than the standard film and the quality was sufficiently good for recycling.

Furthermore, the following recovery treatment was carried out to give a treated chip material and a recycled film.

A first caustic alkali treatment was carried out using a 0.7 wt % aqueous solution of sodium hydroxide at 90° C. for 10 minutes, the sample was strained, and subsequently a second caustic alkali treatment was carried out using a 1 wt % aqueous solution of sodium hydroxide at 110° C. for 25 minutes. The sample was washed with water for 6 minutes, strained and then dried to give treated sample No. 18 and a recycled film. The quality was sufficiently good for recycling.

The treated sample Nos. 17 and 18 repelled water from their surface. It was found from a surface analysis by ESCA that the amount of different organic compounds was equal to or less than that in an actual standard film.

Example 13

A used cinematographic film made by Fuji Photo Film Co., Ltd. comprising a poly(ethylene terephthalate) substrate was cut into chips having a size of about 0.5 to 1.5 cm square, and each of the treatments used for Sample No. 18 of Example 12 were carried out to give recovered chip sample No. 19.

The amount of foreign matter in the recovered film was the same as that of the standard film, and the quality was sufficiently good for recycling. A developed cinematographic film manufactured in the same manner as the above-mentioned film except that poly(ethylene naphthalate) was used as a substrate was also treated in the same manner as above to give a recovered chip sample No. 20. The chip sample No. 20 repelled water from its surface and was not wetted. It was found from a surface analysis by ESCA that the amount of different organic compounds was at the same level as or less than that in the standard film. The quality was sufficiently good for recycling and was similar to a standard film.

Example 14

A used color print film made by Fuji Photo Film Co., Ltd. comprising a poly(ethylene terephthalate) substrate was cut into chips. A recovery treatment was carried out in the same way as for Sample No. 13 of Example 11 to give treated chip sample No. 21. The amount of foreign matter in the recycled film was the same as that in the standard film, and the quality was sufficiently good for recycling.

Example 15

A pressure-sensitive photosensitive material made by Fuji Photo Film Co., Ltd. comprising a poly(ethylene terephthalate) substrate was cut into chips.

Caustic Alkali Treatment

The chip material was treated with a 1 wt % hot aqueous solution of sodium hydroxide at 110° C. for 40 minutes as in Example 11. The treatment liquid was drained and the sample was well strained.

Water Washing Treatment

The chip material was washed with water for 10 minutes while stirring and pouring in water, and it was then strained.

Drying Treatment

The sample was dried at 110° C. for 40 minutes according to Example 11 to give treated chip sample No. 22. A recycled film was prepared according to Example 11. The quality was sufficiently good for recycling.

Similarly, a used heat-sensitive film comprising a poly (ethylene terephthalate) substrate was cut into chips. Treated chip sample No. 23 was obtained by the same treatments as those used for treated chip sample No. 22. Treated chip samples No. 22 and No. 23 repelled water from their surfaces. Their quality was sufficiently good for recycling.

The embodiments of the present invention have been described in detail above, but the present invention can be modified in a variety of ways without departing from the spirit and scope of the invention.

What is claimed is:

1. A method of removing a layer of material from a synthetic resin selected from the group consisting of aromatic polyesters, aromatic polycarbonates, polyimides, polyamides, and an organic acid ester of cellulose, comprising:

washing the layer from the resin with an aqueous alkali solution having a temperature of 105° C. to 130° C., and then washing the alkali solution from the resin.

2. The method as claimed In claim 1 wherein the synthetic resin is an aromatic polycarbonate, aromatic polyester or polypyromellitic imide.

3. The method as claimed in claim 2 wherein the synthetic resin is bisphenol A polycarbonate, poly(ethylene terephthalate) or poly(ethylene naphthalate).

4. The method as claimed in claim 1 wherein the organic acid ester of cellulose is cellulose acetate, cellulose acetate butyrate or cellulose acetate propionate.

5. The method as claimed in claim 1 wherein the aqueous alkali solution has a pH of 10 to 14.

6. A method of removing a layer of material from a synthetic resin according to claim 1, wherein washing is carried out by using a pressure type washing device, providing a polycarbonate substrate having at least one functional layer thereon, the functional layer, selected from the group consisting of a colorant containing layer, a metal reflective layer, a photosensitive layer, a protective layer, an adhering layer and an undercoat layer;

applying an effective amount of an aqueous alkali solution with a pH of at least 10 and a temperature of at least 105° C. to substantially remove the functional layer from the polycarbonate substrate; and washing the alkali solution from the substrate.

7. A method of recovering a polycarbonate substrate comprising the steps of:

providing a polycarbonate substrate having at least one functional layer thereon, the functional layer, selected from the group consisting of a colorant containing layer, a metal reflective layer, a photosensitive layer, a protective layer, an adhering layer and an undercoat layer;

applying an effective amount of an aqueous alkali solution with a pH of 10 to 14 and a temperature of 105 to 130° C. to substantially remove the functional layer from the polycarbonate substrate; and then washing the alkali solution from the substrate.

8. A method of recovering a polycarbonate substrate as claimed in claim 7, wherein the aqueous alkali solution contains at most 20 wt % of a caustic alkali and at most 10 wt % of a surfactant.

9. A method of recovering a polycarbonate substrate as claimed in claim 7, wherein at least two different fresh aqueous alkali solutions are applied to the polycarbonate substrate.

10. A method of recovering a polycarbonate substrate including the steps of:

providing a polycarbonate substrate having at least one functional layer thereon, the functional layer, selected from the group consisting of a colorant containing layer, a metal reflective layer, a photosensitive layer, a protective layer, an adhering layer and an undercoat layer;

applying an effective amount of an aqueous alkali solution with a pH of 10 to 14 and a temperature of 105 to 130° C. to substantially remove the functional layer from the polycarbonate substrate;

applying an effective amount of an aqueous solution containing 0.1 to 10% of hydrogen peroxide; and then washing the hydrogen peroxide solution from the substrate.

11. A method of recovering a polyester substrate comprising the steps of:

pre-cutting a polyester substrate having at least one functional layer thereon, into chips; and then treating them with a 0.1 to 3 wt % aqueous sodium hydroxide solution at a temperature of 105° C. to 130° C.

* * * * *